April 13, 1954 H. C. SMITH 2,674,781
METAL CUTTING TOOL
Filed March 26, 1951
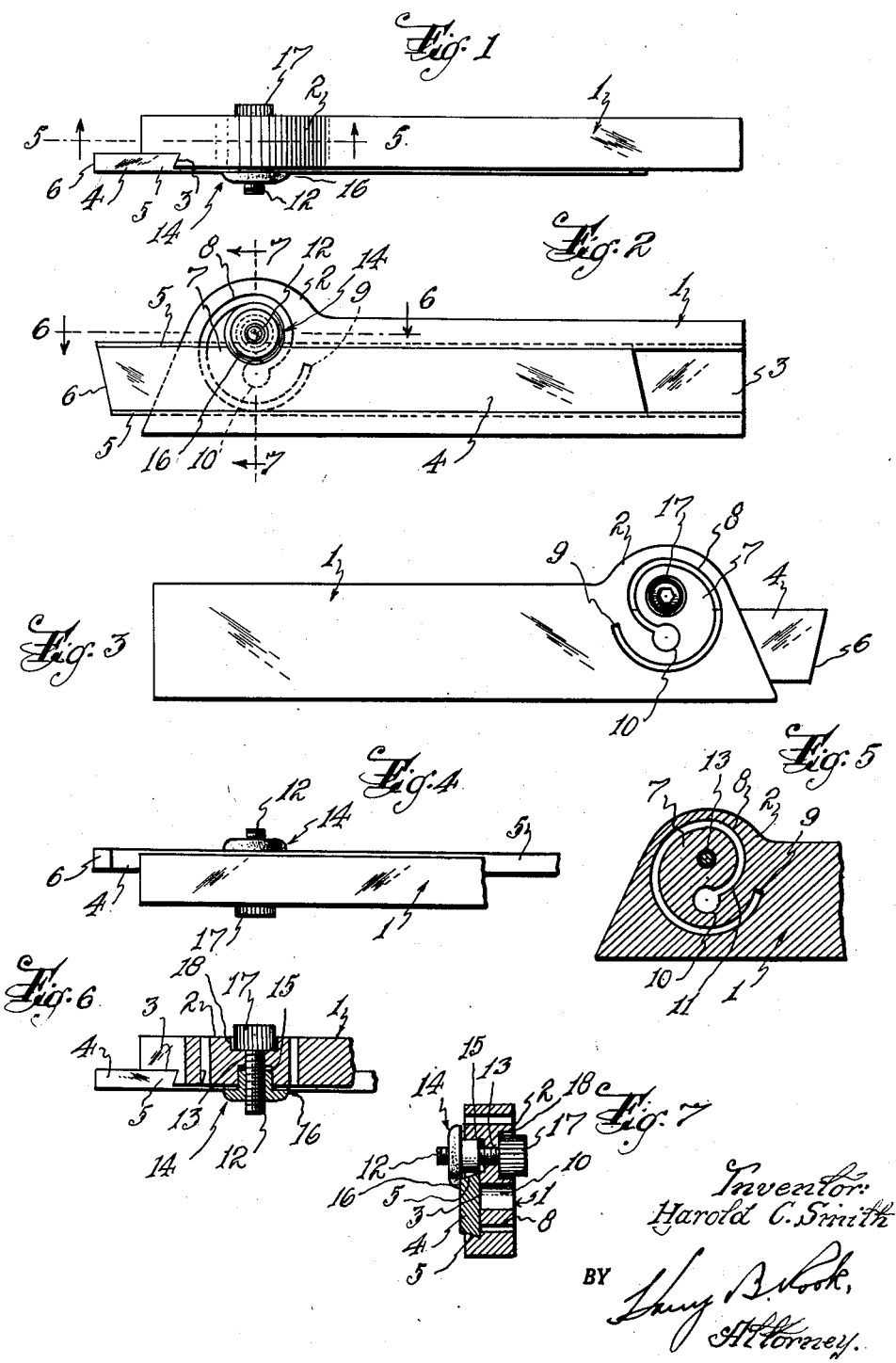
Inventor:
Harold C. Smith
BY
Attorney.

Patented Apr. 13, 1954

2,674,781

UNITED STATES PATENT OFFICE 2,674,781

METAL CUTTING TOOL

Harold C. Smith, West Orange, N. J.

Application March 26, 1951, Serial No. 217,625

2 Claims. (Cl. 29—105)

This invention relates in general to lathe tools and more particularly to a tool holder wherein the cutter, such as is used in cutting-off and thread cutting work is mounted to yield when the tool encounters excessive resistance to cutting, as when the tool is advanced too rapidly into the work or is set for an excessively deep cut, whereby chattering of the tool and gouging of the work is prevented.

Many tools of this general nature have been produced and one thereof is shown in my Patent No. 2,108,237, dated February 15, 1938, but these tools have not been entirely satisfactory in that either the spring action leaves something to be desired or the cost of manufacture of the tools is too great.

Prime objects of the present invention are to provide such a novel and improved tool wherein the spring action of the cutter shall more nearly approach the ideal; and thus to provide a tool holder which shall embody a novel and improved integral spring to which the cutter is connected so that the plate shall be capable of yielding linearly away from the work in the plane of advance of the cutter to the work, upon encountering excessive resistance to cutting, and at the same time lateral movement of the cutter in said plane, downwardly, shall be prevented.

Further objects of the invention are to provide such a tool holder which shall embody a minimum number of simple parts and shall be rugged in construction and relatively inexpensive; and to obtain other advantages and results that will be brought out by the following description in conjunction with the accompanying drawings in which Figure 1 is a top plan view of a tool holder, with tool in position, embodying my invention;

Figure 2 is a side elevational view thereof;

Figure 3 is a view similar to Figure 2 but showing the reverse side;

Figure 4 is a fragmentary bottom plan view;

Figure 5 is a vertical sectional view taken on the plane of the line 5—5 of Figure 1;

Figure 6 is a horizontal sectional view taken on the plane of the line 6—6 of Figure 2; and Figure 7 is a vertical sectional view taken on the plane of the line 7—7 of Figure 2.

Referring to the drawing, the tool holder comprises a shank 1 in the general form of an elongated rectangular bar which may be straight as shown or may be angularly disposed and which is adapted to be removably secured in a suitable supporting fixture (not shown) as in a lathe or other metal working machine. At one end of the shank is a head portion 2 and a continuous under-cut or dove tail groove 3 throughout the length of the tool holder in one side thereof. The groove provides a flat mounting surface for a cutter blade 4 which is slidable within the groove and has its longitudinal edges 5 beveled to fit the under-cut edges of the groove 3. Normally one end of the blade projecting from the shank 1 and is formed into a suitable cutter or bit 6.

The cutter holder or head portion 2 is formed with an integral spring part 7 formed by a slot 8 of substantially spiral or volute formation. The slot commences at the point indicated at 9 at the intersection between the shank and head portion and midway between the top and bottom surfaces of the head portion. It curves forwardly as viewed in Figures 2 and 5, then upwardly and rearwardly and thence downwardly and forwardly terminating in an enlarged hole or recess 10 level with the point 9. The slot 8 divides the part 7 from the rest of the head portion except for the neck portion 11 so as to permit a certain movement of the spring part 7 of the head portion 2 in the space formed by the slot 8 and the free end portion of said spring part extends upwardly from the neck portion and toward the end of the shank opposite said head. The longitudinal edges of the groove 3 are at opposite sides of said neck portion and one of said longitudinal edges intersects said spring part between said neck portion and the free end of the spring part. The slot 8 may be produced either by a saw cut in accordance with a well known process or it may be formed in any suitable manner.

As shown, the cutter blade is thicker than the depth of the groove 3 to permit the outer face of the blade to project beyond the plane of the face of the head portion 2. To rigidly connect the blade to the spring part 7 I provide a clamping screw 12 which passes transversely through an opening 13 in the spring part, and an opening 13 is in line with the hole 10 and above the upper edges of the groove 3 and blade 4. A sleeve nut 14 threaded on to the shank of the screw is adapted to slide in a countersunk portion 15 in the side of the spring part 7. The projecting face of the blade is engaged by the flange portion 16 of the nut. The blade may be rigidly clamped in or released from the spring portion 7 by turning the screw 12 in the proper direction to cause engagement or disengagement of the flange 16 with the cutter blade 4, respectively. The screw may have a socketed head portion 17 adapted to seat in a countersunk portion 18 in the side of the spring part 7 and adapted to receive a suitable pin wrench for turning the screw.

By reason of the shape of the slot 8 and of the spring part 7 of the head portion 2 and by reason of the connection of the blade 4 with the part 7 being above the neck portion 11, should the cutter blade, in use, encounter excessive resistance in the cutting operation, said blade will yield linearly away from the work in a plane approximately parallel to the direction in which the blade has been advanced toward the work, without any appreciable dipping, the spring part 7 smoothly and gradually flexing in a plane parallel to the direction of sliding of the blade and yieldingly resisting the sliding of the blade away from the work. This effectively prevents chattering and jumping of the tool so that tearing or gouging of the work or marking of the same and breaking of the tool point are avoided, and a nice clean smooth finish is obtained.

The blade may be adjusted and reversed as desired to compensate for wear or breakage by simply loosening the nut 14.

Changes in details of construction might be made without departing from the spirit or scope of the invention.

What I claim is:

1. A metal cutting tool comprising a shank having an integral head portion at one end, said head portion being formed with an integral spring part separated from the rest of the head portion by a curved slot and connected to the shank by a neck portion at one end and having its other end free and extending upwardly from the neck portion with its extremity directed toward the other end of the shank, said shank having a groove extending longitudinally along one side thereof and opening through the end of said head portion, the longitudinal edges of said groove being disposed at opposite sides of said neck portion and one longitudinal edge intersecting said spring part between said neck portion and the free end of the spring part, a cutter blade fitted in said groove to longitudinally slide in the plane of advance of the cutter to the work under working thrust on the blade, and means positively connecting said cutter blade to said spring part adjacent the free end of said spring part and above said blade, said spring part being resiliently yieldable in a plane parallel to the direction of sliding of said blade to yieldingly resist longitudinal sliding of the blade in said plane of advance of the blade under working thrust on the blade and at the same time to prevent lateral movement of the blade in said plane.

2. A metal cutting tool comprising a shank having an integral head portion at one end, said head portion being formed with an integral spring part separated from the rest of the head portion by a slot of volute formation and connected to the shank by a neck portion at one end and having its other end free and extending upwardly from the neck portion with its extremity directed toward the other end of the shank, said shank having a groove extending longitudinally along one side thereof and opening through the end of said head portion, the longitudinal edges of said groove being disposed at opposite sides of said neck portion and one longitudinal edge intersecting said spring part between said neck portion and the free end of the spring part, a cutter blade fitted in said groove to longitudinally slide in the plane of advance of the cutter to the work under working thrust on the blade, said spring portion having a transverse opening adjacent its free end and beyond said one edge of said groove, a screw extending through said opening and a clamping nut coacting with said screw and said blade for clamping the blade to the spring part, said spring part being resiliently yieldable in a plane parallel to the direction of sliding of said blade to yieldingly resist longitudinal sliding of the blade in said plane of advance of the blade under working thrust on the blade and at the same time prevent lateral movement of the blade in said plane.

References Cited in the file of this patent

UNITED STATES PATENTS

| Number | Name | Date |
| --- | --- | --- |
| 1,097,818 | Packewitz et al. | May 26, 1914 |
| 1,214,225 | Schillberg | Jan. 30, 1917 |
| 2,108,237 | Smith | Feb. 15, 1938 |
| 2,341,659 | Schillberg | Feb. 15, 1944 |
| 2,371,715 | Smith et al. | Mar. 20, 1945 |
| 2,450,582 | Coyle | Oct. 5, 1948 |
| 2,596,110 | Adrien | May 13, 1952 |